(12) United States Patent
Karta

(10) Patent No.: US 10,709,077 B2
(45) Date of Patent: Jul. 14, 2020

(54) MACROALGAE BIOMASS PRODUCTION

(71) Applicant: SEAKURA PRODUCTS FROM NATURE LTD., Herzliya (IL)

(72) Inventor: Yossi Karta, Caesarea (IL)

(73) Assignee: SEAKURA PRODUCTS FROM NATURE LTD., Herzliya (IL)

( * ) Notice: Subject to any disclaimer, the term of this patent is extended or adjusted under 35 U.S.C. 154(b) by 314 days.

(21) Appl. No.: 15/567,780

(22) PCT Filed: Apr. 19, 2016

(86) PCT No.: PCT/IL2016/050405
§ 371 (c)(1),
(2) Date: Oct. 19, 2017

(87) PCT Pub. No.: WO2016/170529
PCT Pub. Date: Oct. 27, 2016

(65) Prior Publication Data
US 2018/0116139 A1    May 3, 2018

Related U.S. Application Data

(60) Provisional application No. 62/149,693, filed on Apr. 20, 2015.

(51) Int. Cl.
| | | |
|---|---|---|
| *A01K 33/00* | (2006.01) | |
| *A01G 33/00* | (2006.01) | |
| *A01G 22/00* | (2018.01) | |
| *C05B 17/00* | (2006.01) | |
| *C05C 11/00* | (2006.01) | |

(52) U.S. Cl.
CPC .............. *A01G 33/00* (2013.01); *A01G 22/00* (2018.02); *C05B 17/00* (2013.01); *C05C 11/00* (2013.01); *Y02A 40/88* (2018.01)

(58) Field of Classification Search
CPC ........ A01G 33/00; A01G 22/00; A01H 13/00; Y02A 40/88; C12N 1/12
USPC ........................................ 47/1.4, 59 R, 62 N
See application file for complete search history.

(56) References Cited

U.S. PATENT DOCUMENTS

| | | | |
|---|---|---|---|
| 3,195,271 A * | 7/1965 | Golueke ................... | C02F 3/32 |
| | | | 47/1.4 |
| 4,869,017 A | 9/1989 | Bird et al. | |
| 6,986,323 B2 | 1/2006 | Ayers | |
| 7,080,478 B2 | 7/2006 | Levy | |
| 7,484,329 B2 | 2/2009 | Levy | |

(Continued)

FOREIGN PATENT DOCUMENTS

| | | |
|---|---|---|
| CN | 1593105 | 3/2005 |
| CN | 10422129 | 5/2009 |

(Continued)

OTHER PUBLICATIONS

Chan, et al, (Jan. 25, 2013) Effects of deep seawater medium on growth and amino acid profile of a sterile Ulva pertusa Kjellman (Ulvaceae Chlorophyta), Journal of Applied Phycology, vol. 25, No. 3; pp. 781-786.

Israel, et al (2006) Experimental tank cultivation of Porphyra in Israel, Journal of Applied Phycology, 18: 235-240.

Friedlander, M (2008) Israeli R&D activities in seaweed cultivation. Israel Journal of Plan Sciences, 56(1-2), 15-28.

(Continued)

*Primary Examiner* — Trinh T Nguyen
(74) *Attorney, Agent, or Firm* — The Roy Gross Law Firm, LLC; Roy Gross

(57) ABSTRACT

The present invention relates to systems and methods for the cultivation and processing of high quality macroalgae, particularly for the cultivation of edible seaweed on a commercial scale.

20 Claims, 2 Drawing Sheets

(56) References Cited

U.S. PATENT DOCUMENTS

| | | | |
|---|---|---|---|
| 8,507,254 B1* | 8/2013 | Abuhasel | A01G 33/00 435/257.1 |
| 8,633,011 B2 | 1/2014 | Palmer et al. | |
| 2005/0120624 A1 | 6/2005 | Levy | |
| 2006/0254134 A1 | 11/2006 | Levy | |
| 2008/0083160 A1* | 4/2008 | Levy | A01G 33/00 47/1.4 |
| 2013/0269244 A1* | 10/2013 | Jovine | A01G 33/00 47/1.4 |
| 2014/0248680 A1* | 9/2014 | Powell | C12N 1/12 435/176 |
| 2017/0127656 A1* | 5/2017 | Bee | A01K 63/006 |

FOREIGN PATENT DOCUMENTS

| | | |
|---|---|---|
| CN | 101653094 | 2/2010 |
| CN | 102144530 | 8/2011 |
| CN | 103931480 | 7/2014 |
| WO | 2005051073 | 6/2005 |

OTHER PUBLICATIONS

Hiraoka and Oka (2008) Tank Cultivation of Ulva prolifera in deep seawater using a new "germling cluster" method, Journal of Applied Phycology, 20(1):97-102.
International Search Report Application No. PCT/IL2016/050405 Completed Aug. 9, 2016; dated Aug. 9, 2016 4 pages.
Written Opinion of the International Searching Authority Application No. PCT/IL2016/050405 dated Aug. 9, 2016 7 pages.

* cited by examiner

MACROALGAE BIOMASS PRODUCTION

This application is a National Phase of PCT Patent Application No. PCT/IL2016/050405 having International filing date of Apr. 19, 2016, which claims the benefit of priority of U.S. Provisional Application No. 62/149,693 filed on Apr. 20, 2015. The contents of the above applications are all incorporated by reference as if fully set forth herein in their entirety.

FIELD OF THE INVENTION

The present invention relates to systems and methods for the cultivation and processing of high quality macroalgae, particularly for the cultivation of edible seaweed on a commercial scale.

BACKGROUND OF THE INVENTION

The growing number of human population leads to a constant search for additional and alternatives food sources for human as well as for other animals down the food chain. Macroalgae, known by the common name seaweeds, are one of the most promising future sources of healthy food products. Seaweeds contain balanced amounts of proteins, free amino acids, vitamins, minerals, fiber and unsaturated fatty acids in consumption available forms. Moreover, macroalgae contain high concentrations of essential micronutrients including iron, calcium and magnesium that are needed in the daily diet. In addition to the high nutritional value, macroalgae also provide a solution to the growing demand for sustainable agriculture systems and for reducing the amounts of animal-based food products.

However, the use of macroalgae as food is still scarce, particularly in the Western world. Apart from matters of taste and habits, this limited use is highly correlated with the lack of systems for efficient production of macroalgae on commercial scales.

Attempts for optimizing the growth and yield of macroalgae have been made. For example, U.S. Pat. No. 4,869,017 discloses methods for enhancing the production of macroalgae, including *Gracilaria*, in a marine culture system by improving the culture medium. The method comprises first adjusting the alkalinity of a quantity of freshwater by the addition of an alkaline reagent thereto, diluting seawater with such alkalinity adjusted freshwater to create a saline solution having a salinity of between about 15 to 25 parts per thousand and an alkalinity of between about 3 to 10 meq/l., dissolving carbon dioxide in the resulting solution to bring its pH to between about 7.5 and 8.5, and using such carbon dioxide enriched solution as the culture medium.

U.S. Pat. No. 6,986,323 provides overview of systems and method for mariculture growth. It discloses a novel method and system for the inland aquaculture of marine species using water from a saline aquifer having heavy metals content within the acceptable limits of the EPA guidelines for drinking water. The aquifer is preferably the Coconino aquifer located in Arizona and New Mexico. The system can be used to culture microalgae, macroalgae, fish, shrimp and many other marine species. Nutrients and fertilizers can be added to the water to optimize culture conditions for particular species. Useful products can be isolated from the marine species or the cultured marine species can be harvested as useful products themselves.

U.S. Pat. Nos. 7,080,478 and 7,484,329 disclose technology, systems and methods of cultivating different types of seaweeds in land-based seawater ponds having a climatically suitable and nutrient controlled environment. These land-based ponds may be built in any part of the world with structural engineering and architectural modifications. The invention provides methods of designing different stages of growth, and defining the special conditions to optimize each of the different stages in controlled environments. The technology includes techniques of enriching the seaweeds with desired nutrients and ingredients for the production of high quality products that are free of marine pollutants, in addition to generating maximum yields under optimum, clean, temperature controlled and stable environmental conditions.

U.S. Pat. No. 8,633,011 discloses methods and systems for the production of macroalgae in a manner to provide a sustained, economical source of biomass that may be used in various end-use processes, including energy production. The patent discloses specific combinations of macroalgae types, saltwater growth medium compositions, and open-pond water containers that results in biomass production beyond what may occur naturally without the required manipulation. Specifically, macroalgae that produce an exoskeleton in the presence of brackish water (e.g., stoneworts) have been found to provide excellent biomass production under the conditions of the invention.

However, there is a need for and it would be highly advantageous to have integrated systems addressing all the growth parameters involved in the commercial growth of macroalgae.

SUMMARY OF THE INVENTION

The present invention provides systems and methods for the cultivation and processing of macroalgae, particularly edible macroalgae. The land-based systems of the present invention overcome many of the obstacles preventing the production of macroalgae on a useful and economical scale. The systems of the invention combines high quality, pristine seawater that are devoid of contaminants and pathogens yet comprise desired micronutrients and innovatively designed cultivation tanks and ponds, providing for growth conditions resulting in high yield and high quality of macroalgae, particularly edible macroalgae. The macroalgae harvested from the system are ready to use and need minimal processing before marketing.

The system and methods of the present invention is advantageous over hitherto known systems at least in that (i) the water used are pristine seawater, typically seawater obtained from deep costal well; (ii) the entire system is an outdoor system with the temperature controlled only by the seawater temperature in all the growth stages; (iii) the unique aeration and/or jet water systems provide for optimal macroalgae suspension and distribution within the tanks and ponds (iv) the macroalgae can be harvested from each pond, depending on the desired macroalgae amount, without the need of specialized harvesting system; and (v) high yield of 200 to 400 gr macroalgae per day per $m^2$ growing area can be obtained, and growth cycles can take place under variable weather conditions, including during summer and winter conditions in Israel. As used herein, "summer" or "summertime" refers to the beginning of April to the end of September; and "winter" or "wintertime" refers to the beginning of October to the end of March.

According to one aspect, the present invention provides a land-based system for the production of macroalgae, the system comprising:

(a) a reservoir containing pristine seawater;
(b) at least one inoculum tank comprising at least one of a gas distribution system, a jet water system or a combination thereof, the inoculum tank containing a culture medium and pieces of a macroalgae young thalli, wherein the culture medium comprises pristine seawater from the reservoir; and
(c) at least one cultivation pond comprising at least one of a gas distribution system, a jet water system or a combination thereof, the at least one cultivation pond containing a culture medium and macroalgae, wherein the culture medium comprises pristine seawater from the reservoir.

According to certain exemplary embodiments, the system further comprises a mesh covering the at least one inoculum tank and/or the at least one cultivation pond.

According to certain exemplary embodiments, the pristine seawater is obtained from at least one deep costal well. According to other embodiments, the pristine seawater is purified seawater obtained from a water treatment system. According to yet additional embodiments, the pristine water is a combination of pristine seawater obtained from at least one deep costal well and purified seawater obtained from a water treatment system. According to certain exemplary embodiments, the seawater treatment system comprises a sand filter, ozonation tank and active carbon filter.

According to certain embodiments, the temperature of the pristine seawater is from about 2° C. to about 30° C. According to certain exemplary embodiments, the temperature of the pristine seawater is a constant temperature of from about 20° C. to about 25° C. According to certain further exemplary embodiments, the pristine seawater temperature is 22° C.

According to additional embodiments, the pristine seawater is essentially free from pollutants including, but not limited to, heavy metals, Polychlorinated biphenyls (PCBs), dioxins and pathogens. According to some embodiments, the pristine seawater is rich in essential minerals including, but not limited to calcium, magnesium and carbonates. According to some embodiments, the culture medium consists of the pristine seawater. According to certain embodiments, the culture medium further comprises additional nutrients, including, but not limited to, nitrogen and phosphate.

According to certain exemplary embodiments, the inoculum tank has a half-ball shape. According to additional exemplary embodiments, the inoculums tank has a volume of 0.5-3 cubic meters ($m^3$).

According to certain embodiments, the opening of the cultivation pond has a quadrangle configuration. According to certain exemplary embodiments, the opening has a square configuration. According to other exemplary embodiments, the opening has a rectangle configuration. According to certain embodiments, the cultivation pond has a cubic configuration. According to certain additional exemplary embodiments, the cultivation pond is of a U shape. When a plurality of cultivation ponds is used with the systems and methods of the present invention, the configuration and/or shape of each cultivation pond within the plurality of cultivation ponds can be the same or different.

According to certain exemplary embodiments, the culture medium encompasses from about 80% to about 90% of the cultivation pond volume.

According to certain embodiments, the gas distribution system comprises a gas source device and a plurality of gas tubes comprising at least one gas inlets and a plurality of gas outlets, wherein the plurality of gas tubes is positioned along the base of the cultivation pond. According to certain embodiments, the plurality of gas tubes is located at a distance of 30-50 cm from each other and from the longitude walls of said cultivation pond. According to certain exemplary embodiments, the plurality of gas tubes is located at a distance of 40 cm from each other and from the longitude walls of said cultivation pond. According to certain exemplary embodiments, each gas tube has a diameter of about 50 mm. According to other exemplary embodiments, the gas outlets are positioned along the gas tube 30 cm apart. According to additional embodiments, each gas outlet comprises an opening having a diameter of 2-4 mm.

According to certain embodiments, the gas is air. When in use, gas passes through the culture medium from the bottom of the cultivation pond to the top.

According to certain embodiments, the jet water system comprises an array of jet water pipes connected by at least one water pipeline and positioned along the cultivation pond walls, wherein each jet water pipe comprises a valve. According to some embodiments, the pipeline is located close to the surface of the cultivation medium, and the jet water pipes face downwards towards the bottom of the cultivation pond. According to other embodiments, the pipeline is located at the bottom of the cultivation pond and the jet water pipes face upwards towards the surface of the cultivation medium. According to certain embodiments, the opening of each water pipe is at least 50 cm below the surface of the cultivation medium. According to some embodiments, the water pipe has a diameter of from about 10 mm to about 30 mm. According to some embodiments, the array comprises jet water pipes having the same diameter. According to other embodiments, the array comprises jet water pipes having different diameters. According to certain embodiments, the jet water pipes are arranged at a distance of from about 40 cm to about 150 cm from each other. According to some embodiments, the valve of each jet water pipe is set to give a water flow of from about 1 to about 3 $m^3$/h. According to some embodiments, all valves in the jet water pipe array are set to give the same water flow. According to other embodiments, the valves in the jet water pipe array are set to give different water flows.

According to certain exemplary embodiments, the cultivation pond or plurality of cultivation ponds of the present invention comprise a combination of gas distribution system and jet water system.

The unique configuration of the plurality of gas tubes and/or jet water pipes provides for the suspension, uniform distribution and circulation of the macroalgae within the cultivation pond. Without wishing to be bound by any specific theory or mechanism of action, the gas-induced and/or jet water induced suspension and circulation provides for the optimal growth of the macroalgae by enabling optimal exposure to sunlight with minimal damage to the circulating macroalgae.

According to yet additional embodiments, each of the cultivation ponds comprises one or more liquid ports which act as inlets and/or outlets for the passage of liquid into and out of the cultivation pond to allow the setting of the water flow rate within the cultivation pond. According to additional embodiments, the liquid ports further allow the harvesting and refilling of said cultivation pond. According to certain embodiments, the liquid is pristine seawater from the reservoir.

According to certain typical embodiments, the cultivation pond or plurality of cultivation ponds of the present invention comprise a combination of gas distribution system; a jet water system and one or more liquid ports.

When the system comprises a plurality of inoculum tanks and/or cultivation ponds, the shape, configuration, and volume of the inoculums tanks and/or cultivation ponds can be the same or different.

According to certain exemplary embodiments, the system comprises a plurality of inoculum tanks.

According to certain embodiments, the system comprises a plurality of cultivation ponds. According to some embodiments, the volume of each of the cultivation pond is from 1-1000 m³.

According to certain embodiments, the system comprises at least two, at least three or at least four cultivation ponds.

According to certain embodiments, the cultivation pond is selected from the group consisting of:

A cultivation pond having a volume of 5-10 cubic meters (5-10 m³ cultivation pond);

A cultivation pond having a volume of 20-30 cubic meters (20-30 m³ cultivation pond);

A cultivation pond having a volume of 40-70 cubic meters (40-70 m³ cultivation pond);

A cultivation pond having a volume of 200-500 cubic meters (200-500 m³ cultivation pond); and any combination thereof.

According to certain exemplary embodiments, the area of the 5-10 m³ cultivation pond base is 6 m²; the area of the 20-30 m³ cultivation pond base is 18 m²; the area of the 40-70 m³ cultivation pond base is 54 m²; and the area of the 200-500 m³ cultivation pond base is 250 m².

According to certain exemplary embodiments, the system comprises at least one 5-10 m³ cultivation pond; at least one 20-30 m³ cultivation pond; and at least one 200-500 m³ cultivation pond.

According to additional exemplary embodiments, the system comprises at least one 5-10 m³ cultivation pond; at least one 20-30 m³ cultivation pond; at least one 40-70 m³ cultivation pond and at least one 200-500 m³ cultivation pond.

According to certain exemplary embodiments, the 5-10 m³ cultivation pond contains macroalgae obtained from the inoculum tank; the 20-30 m³ cultivation pond contains macroalgae obtained from the 5-10 m³ cultivation pond; the 40-70 m³ cultivation pond contains macroalgae obtained from the 20-30 m³ cultivation pond and the 200-500 m³ cultivation pond contains macroalgae obtained from the 20-30 m³ cultivation pond or from the 40-70 m³ cultivation pond.

The different inoculums tanks and/or cultivation ponds can be connected to allow easy transportation of the macroalgae between the tanks/ponds by any means and methods as are known in the art.

According to certain embodiments, the mesh covering the inoculums tank(s) and/or the cultivation pond(s) protects the culture medium comprising the macroalgae from airborne pathogens.

The culture medium pH, temperature and nutrient composition may vary depending on the macroalgae species grown in the system. The system of the present invention is advantageous over hitherto known open systems for growing macroalgae as the growth conditions can be manipulated such that growth is enabled year-round, particularly under Israel weather conditions and weather conditions equivalent thereto. Advantageously, the temperature of the pristine seawater enables the manipulation of the culture medium temperature, and as a result of the pH, by adaptation of the water flow rate.

According to some embodiments, the pH of the culture medium is kept below 9.5. According to certain exemplary embodiments, the pH is kept at the range of from 7.5-9.5.

According to certain exemplary embodiments, the macroalgae are of a genus selected from the group consisting of, but not limited to, *Ulva*, *Porphyra* (Nori), *Laminaria*, *Undaria*, *Eucheuma*, *Gracillaria*, *Sargassum*, *Codium*, *Furcellaria*, *Cladophora*, *Ascophyllum* and *Palmaria*.

According to certain exemplary embodiments, the macroalgae are of the genus *Gracilaria*. According to some exemplary embodiments, the macroalgae are of the species *Gracilaria cornea*. According to additional exemplary embodiments, the macroalgae are of the genus *Ulva*. According to some exemplary embodiments, the macroalgae are of the species *Ulva lactuca*.

According to yet another aspect, the present invention provides a method for cultivating macroalgae, the method comprising:

(a) providing at least one inoculum tank having a volume of 0.5-3.0 cubic meter, containing a culture medium comprising pristine seawater;

(b) inoculating the inoculum tank with about 100-200 g of fragmented young thalli of a macroalga;

(c) growing the macroalga within the inoculums tank to reach a macroalgae inoculum fresh total mass of about 2-15 kg;

(d) transferring the macroalgae inoculum mass or a part thereof to a cultivation pond having a volume of 5-10 cubic meter comprising operating gas distribution system and/or operating array of jet water pipes, containing a culture medium comprising pristine seawater;

(e) growing the macroalgae inoculum within the 5-10 m³ cultivation pond to reach a macroalgae total fresh mass of about 10-60 kg;

(f) transferring the macroalgae mass or a part thereof to a cultivation pond having a volume of 20-30 cubic meter comprising operating gas distribution system and/or operating array of jet water pipes, containing a culture medium comprising pristine seawater;

(g) growing the macroalgae within the 20-30 m³ cultivation pond to reach a macroalgae fresh mass of about 100-200 kg;

(h) harvesting the macroalgae mass; or optionally (i) transferring at least part of the macroalgae mass of the 20-30 m³ cultivation pond to a cultivation pond having a volume of 200-500 cubic meter comprising operating gas distribution system and/or operating array of jet water pipes, containing culture medium comprising pristine seawater;

(j) growing the macroalgae within the 200-500 m³ cultivation pond to reach a macroalgae total fresh mass of at least 300-1,000 kg; and (k) harvesting the macroalgae fresh mass.

According to certain embodiments, step (i) comprises (1) transferring at least part of the macroalgae mass of the 20-30 m³ cultivation pond to a cultivation pond having a volume of 40-70 cubic meter comprising operating gas distribution system and/or operating array of jet water pipes, containing culture medium comprising pristine seawater;

(2) growing the macroalgae within the 40-70 m³ cultivation pond to reach a macroalgae fresh mass of about 100-200 kg;

(3) harvesting the macroalgae mass; or optionally (4) transferring at least part of the macroalgae mass of the 40-70 m³ cultivation pond to a third cultivation pond having a volume of 200-500 cubic meter comprising operating gas distribution system and/or operating array of jet water pipes, containing culture medium comprising pristine seawater.

According to certain exemplary embodiments, growing the macroalgae within the inoculums tank at step (c) further comprises fragmentation of the grown macroalgae to pieces of 2-15 cm².

Growing macroalgae according to the method of the present invention results in a high quality of the harvested algal mass.

While particular values of quality parameters depend on the species of the macroalga grown, the method of the present invention universally provides for intact thalli of the harvested macroalgae, typically having deep color. According to certain embodiments, the protein and/or the mineral content within the harvested macroalgae is higher compared to the protein and/or nutrient content within macroalgae of the same species cultured in the wild or harvested from the wild.

According to certain embodiments, the harvested macroalgae comprises at least 20%, at least 30% or at least 40% proteins out of the total dry weight of the macroalgae. According to certain exemplary embodiments, the harvested macroalgae is of the genus *Ulva*. According to additional embodiments, the average thallus surface of the harvested *Ulva* is about 20 cm².

According to certain embodiments, the pristine seawater is essentially free from pollutant including, but not limited to heavy metals, PCBs and dioxins and from pathogens. According to certain exemplary embodiments, the pristine seawater is obtained from a deep costal well, is purified seawater or a combination thereof.

The structure of the at least one inoculum tank and of the at least one cultivation pond is as described hereinabove.

The time required to reach the desired macroalgae mass in each of the inoculums tanks and/or cultivation ponds depends on the environmental conditions (air temperature, water temperature, light intensity, light duration, etc.), as are derived from the season of the year and the local weather as well as from the specific macroalgae species grown.

According to some embodiments, the macroalgae are grown in the inoculum tank for 6-30 days.

According to some embodiments, the macroalgae are grown in the 5-10 m³ cultivation pond for 6-45 days.

According to some embodiments, the macroalgae are grown in the 20-30 m³ cultivation pond for at least 7 days, typically between 7-45 days.

According to some embodiments, the macroalgae are grown in the 40-70 m³ cultivation pond for at least 10 days, typically between 10-40 days.

According to some embodiments, the macroalgae are grown in the 200-500 m³ cultivation pond for 5-25 weeks.

According to certain exemplary embodiments, the culture medium is supplemented with of 0.5-4 g nitrogen per m² per day and 0.2-1.0 g phosphate per m² per day. Supplementing the nutrients to the culture medium may be performed using any method and/or apparatus as is known in the art. According to certain embodiments, nutrients are supplemented using an automated dripping system. It is of high importance to keep a balanced nutrient concentration and a certain pH range. According to certain embodiments, such balance is maintained by dripping the nutrients into the culture medium during day light only, when the macroalgae are photosynthetically active.

The pH of the culture medium throughout the system is kept below 9.5. The pristine seawater temperature can be maintained at any temperature from about 2° C. to about 30° C. According to certain embodiments, the pristine seawater temperature is kept at 20-25° C., typically at 22° C. One of the advantages of the method of the present invention resides in that the growth medium pH and temperature are kept constant throughout the system, and in that it is done by changing the water flow rate within the inoculums tanks and cultivation ponds without the need to add pH-adjusting compounds and/or to use heating or cooling devices.

The water flow rate thus depends on the culture medium volume and the macroalgae growth stage. According to certain exemplary embodiments, the water flow rate within the inoculums tank is 0.1-0.5 m³/h; the water flow rate within the 5-10 m³ cultivation pond is 0.5-1.5 m³/h; the water flow rate within the 20-30 m³ cultivation pond is 1.5-3 m³/h; the water flow rate within the 40-70 m³ cultivation pond is 0.5-3 m³/h; and the water flow rate within the 200-500 m³ cultivation pond is 1.0-2.0 m³/h.

Without wishing to be bound by any specific theory or mechanism of action, the configuration of the cultivation ponds comprising the gas distribution system and/or the jet water pipe array contributes significantly to the high yield of macroalgae obtained and to its high quality. This configuration provides for the suspension and circulation of the macroalgae within the cultivation tank(s)/pond(s) in a manner that does not rip the delicate thalli of the macroalgae, yet enables exposure of the entire algal mass to the sunlight, optimizing the photosynthetic rate of the macroalgae.

According to certain exemplary embodiments, the gas distribution system provides gas at a rate of 2.5-3.0 m³ gas/m² of algal growth.

According to certain exemplary embodiments, the jet water pipes are configured to provide a water flow of 0.5-3 m³/h.

According to certain exemplary embodiments, the gas is ambient air. According to certain exemplary embodiments, the ambient air is filtered before the gas inlet as to prevent contamination of the culture medium with air-borne pathogens.

Harvesting of the macroalgae is typically performed via the liquid outlets that are part of the cultivation pond design.

Other objects, features and advantages of the present invention will become clear from the following description and drawings.

DETAILED DESCRIPTION OF THE INVENTION

Figure 1:
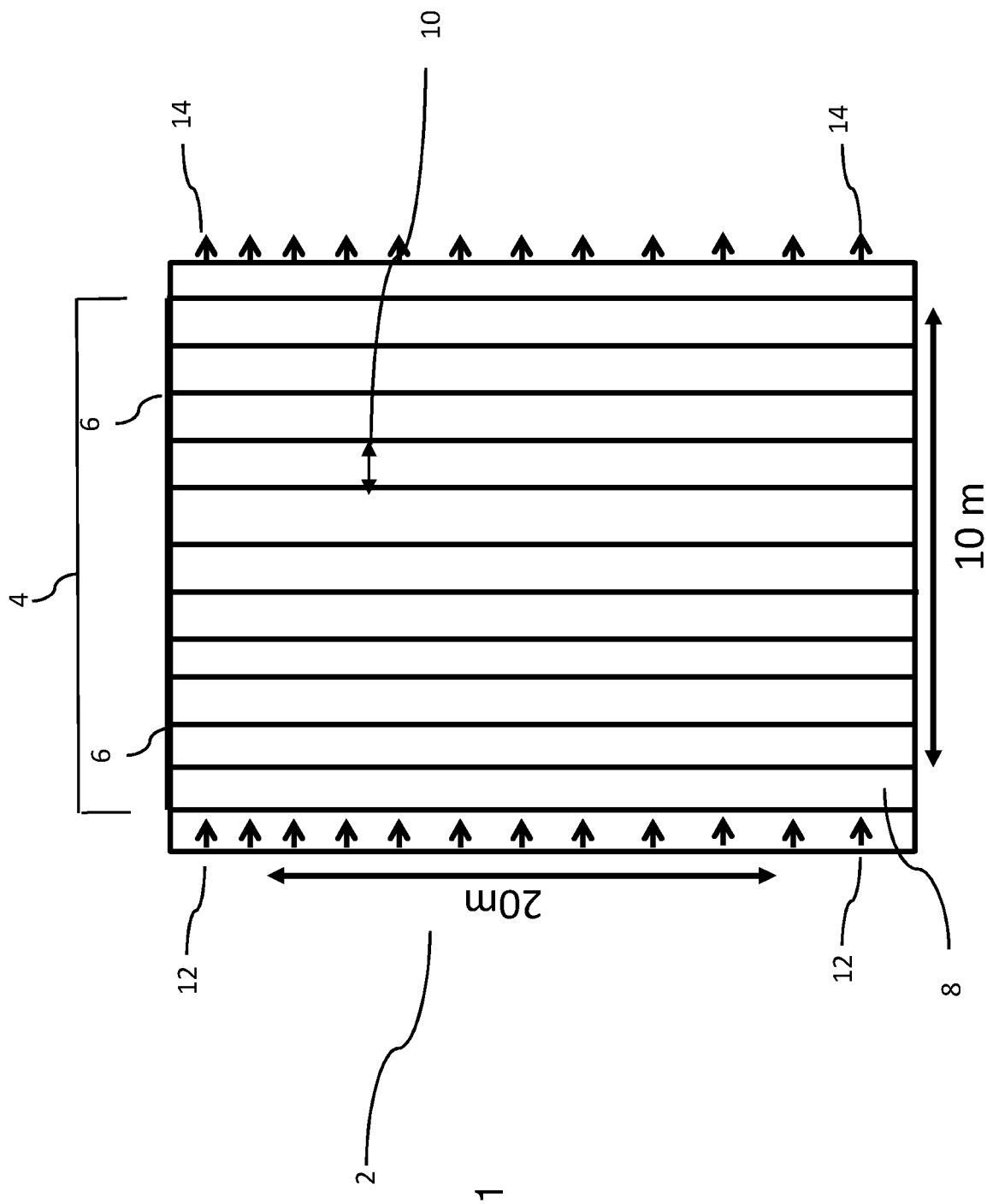
FIG. 1 is a schematic presentation of a cultivation pond.

Referring to FIG. 1, providing a top cross section of an exemplary cultivation pond, the cultivation pond of 200 m³ (2) contains gas distribution system (4) comprising a plurality of gas tubes (6) located on the base (8) of the cultivation pond at a distance of 40 cm from each other (10). The cultivation pond (2) further contains a plurality of liquid inlet ports (12) and outlet ports (14).

Figure 2:
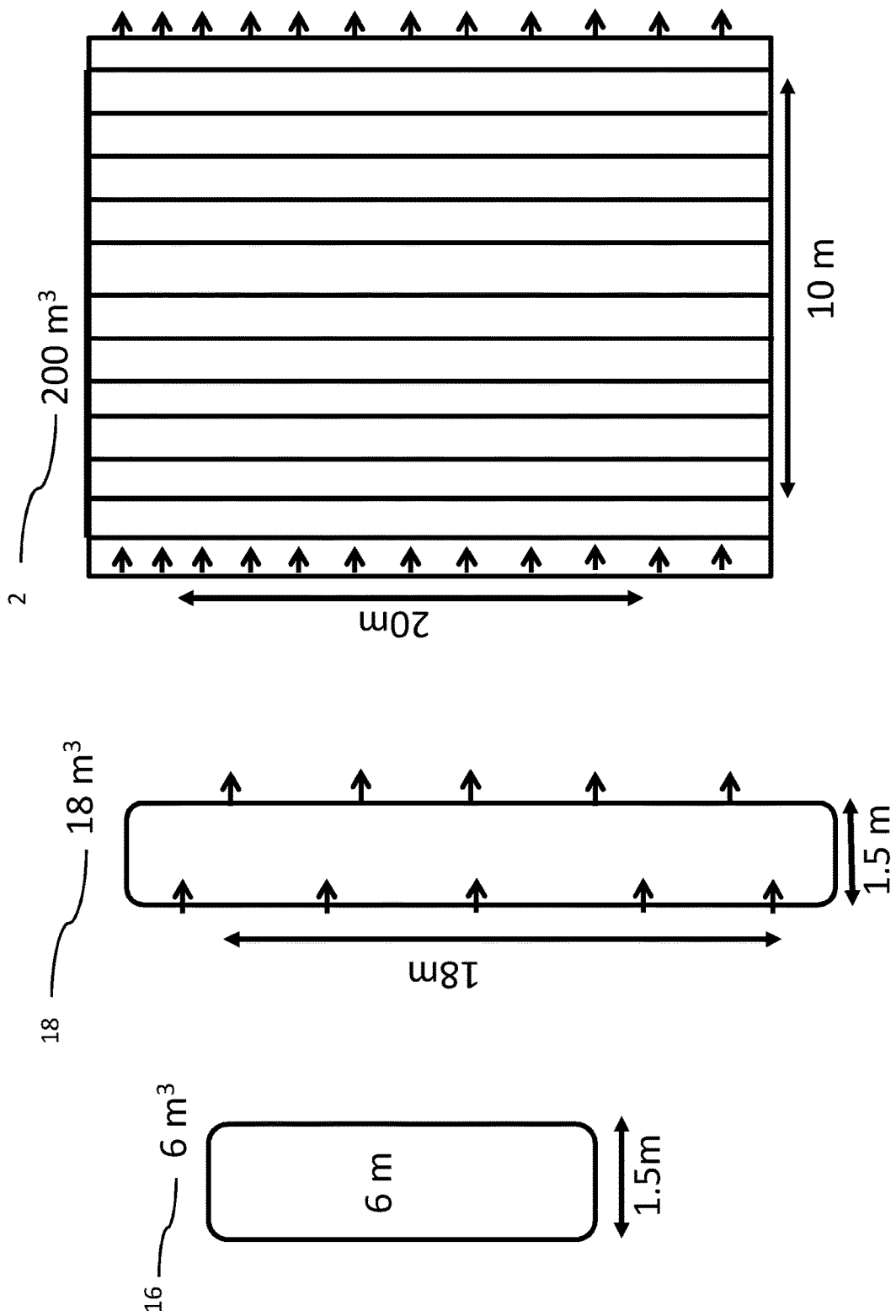
FIG. 2 is a schematic presentation of typical design of cultivation ponds.

Referring to FIG. 2, a typical design of cultivation ponds contains a first cultivation pond having a volume of 6 m³ (16), a second cultivation pond having a volume of 18 m³ (18) and a third cultivation pond having a volume of 200 m³ (2).

Pristine Seawater

The water used throughout the system of the present invention is high quality seawater typically obtained from deep costal well. The principal advantage of using seawater from costal wells is in the natural filtration of the water through the sand and rock layers separating the well from the sea. The main benefit of using well seawater is that the water obtained is essentially free from pollutants such as heavy metals, PCBs, dioxins (2,3,7,8-tetrachlorodibenzo para dioxin (TCDD) and chemically related polychlorinated dibenzo para dioxins (PCDDs) and polychlorinated dibenzofurans (PCDFs)) and from any flora or fauna species that can interfere with the culture of the target macroalgae, including pathogenic or parasitic flora and/or fauna. As used herein, the term "essentially free from heavy metal" refers to heavy metals content within the acceptable limits for drinking water.

According to certain exemplary embodiments, the system of the present invention further comprises a deep costal well.

Inoculum Growth

Having high quality algal inoculums is a key feature in successful growth of macroalgae. Its growth in the system of the present invention ensures a constant source of high quality algae for all stages.

100-200 liter tanks at a shape of half-ball are used. Before each growth cycle the tanks are cleaned from any organic remains, typically with water, or with water and chlorine. The tanks are inspected not to include any remaining of parasitic or other non-desired algae or phytoplankton organisms. Typically, inoculum growth starts at a small tank of 100 liter filled with pristine seawater to a height of at least about 50 cm (measured at the half-ball center). It is of high importance that the algae used for starting the inoculums are also clean from any other organism. The macroalgae are therefore typically washed with water and/or brushed gently. Clean algae are then placed in the tank and the water flow is adjusted to 10-35 liters/hour for the first three days. Thereafter, the water flow rate is adjusted according to the algae growth rate and water pH. Typically, the water flow rate is elevated to 100 liter/h. It is however should be explicitly understood that the time of growth and the water flow rate depended on the algae species grown and the environmental conditions, particularly the water and ambient air temperature and the duration and intensity of sunlight.

It is further of high importance to keep young thalli of the macroalgae in the inoculum. This is achieved by hand fragmentation of the growing algal mass.

Optionally, when the algae within the inoculum tank reach a mass of at least 0.6 Kg, typically between 0.6 Kg and 1.0 Kg, the algal mass is transferred to a larger inoculums tank of 200 liter, containing pristine seawater at a height of at least about 30 cm (measured at the half-ball center). The water flow rate in the 200 liter inoculum tank is adjusted to 70-110 liter/h for the first 3 days of algal growth, and adjusted thereafter according to the observed algae growth rate and water pH. Growth is continued until the algae reach a mass sufficient to inoculate a 5-10 $m^3$ cultivation pond. Typically, when the algae reach a total mass of at least 2 Kg, typically between 3 Kg to 6 kg, the algae are harvested to serve as the inoculums of the 5-10 $m^3$ cultivation pond.

At times, the inoculum growth requires the addition of nitrogen and phosphorous. Amounts added are those added to the inoculum tank(s) of 2 g nitrogen per $m^2$ per day and 0.6 g phosphorous per $m^2$ per day. Nitrogen is added as ammonium sulfate $(NH_4)_2SO_4$ (21% N) and phosphorous as mono-ammonium phosphate $(NH_4H_2PO_4)$ using a dripping system.

5-10 $m^3$ Cultivation Pond

The cleansing requirements of the cultivation ponds and of the algae should be kept throughout the growth process, i.e. the ponds and the algae must be cleaned from any organic remaining and/or non-desired organisms.

The cultivation pond having a volume of 5-10 $m^3$, typically having a volume of 6 $m^3$ is filled with pristine seawater from the reservoir such that the water height is not exceeding 100 cm, typically the height being about 85 cm. Algae inoculum of at least 3 Kg is added. The 5-10 $m^3$ cultivation pond can receive inoculum of 3-10 Kg while keeping good growth rate and obtaining algae at a good quality. Optimal inoculum mass is typically between 4-5 Kg.

Algal circulation, suspension and uniform distribution are achieved by the operation of the gas distribution system typically at air supply rate of 2.5-3.0 $m^3/m^2$ and/or, by the operation of jet water pipes, typically at a jet water flow of 1-3 $m^3/h$. When required, nitrogen and phosphorous are added as described for the inoculum tank above. Macroalgae are grown in the 5-10 $m^3$ cultivation pond to reach fresh mass of 10-60 Kg. Water flow to support optimal growth is set to 1 $m^3/h$. The duration required to reach the desired algal mass depend on the environmental conditions, particularly on the day length. Typically, the algal mass is reached within about 7 days of growth in Israel during summertime and within about 14 days in Israel during wintertime. Typically, 10-50 Kg of fresh algal mass is harvested from the 5-10 $m^3$ cultivation pond.

20-30 $m^3$ Cultivation Pond

The cultivation pond having a volume of 20-30 $m^3$, typically having a volume of 18 $m^3$ is filled with pristine seawater from the reservoir. As for the 5-10 $m^3$ cultivation pond, the seawater height is kept at up to 100 cm, typically the height being about 85 cm, and water flow is set to 2 $m^3/h$. Macroalgae grown in the 20-30 $m^3$ cultivation pond may form the starting material for the larger, 40-70 $m^3$ and/or for the 200-500 $m^3$ cultivation ponds or can be harvested for further processing of the macroalgae product. Partial harvest may be also performed such that the remaining material in the 20-30 $m^3$ cultivation pond forms a starter for a second harvest from the same pond. Several harvest rounds can be performed in the 20-30 $m^3$ cultivation pond; the number of harvests depends on the algal growth rate and on the quality of the macroalgae produced. Typically, algal fresh mass of about 100-200 Kg is produced within 7 days (Israel summertime) or within 14-21 days (Israel wintertime).

Algal circulation, suspension and uniform distribution and nutritional addition are performed as described above.

40-70 $m^3$ Cultivation Pond

Optionally, a cultivation pond having a volume of 40-70 $m^3$ also forms part of the systems and methods of the present invention. The cultivation pond, typically having a volume of 54 $m^3$, is filled with pristine seawater from the reservoir. As for the previous cultivation ponds, the seawater height is kept at up to 100 cm, typically at about 85 cm. Water flow is set to about 0.8 $m^3/h$ (Israel wintertime) or to 2 $m^3/h$ (Israel summertime). The algal mass harvested from the 40-70 $m^3$ cultivation pond may serve as starting material to additional pond(s) or may be harvested. Typically, macroalgae grown in the 40-70 $m^3$ cultivation pond form the starting material for the largest 200-500 $m^3$ cultivation ponds or can be harvested for further processing of the macroalgae product. Partial harvest may be also performed such that the remaining material in the 40-70 $m^3$ cultivation pond forms a starter for a second harvest from the same pond. Several harvest rounds can be performed in the 40-70 m³ cultivation pond; the number of harvests depends on the algal growth rate and on the quality of the macroalgae produced. Typically, the average algal fresh mass obtained yearly from this cultivation pond is about 300-400 Kg.

Algal circulation, suspension and uniform distribution and nutritional addition are performed as described above.

200-500 m³ Cultivation Pond

The 200-500 m³ cultivation pond forms the largest growth volume in the system of the present invention. The volume of this cultivation pond is typically about 200 m³, but larger ponds of 500 m³ and up to 1,000 m³ can be also used. Water flow is typically set to 1.4 m³/h. The algal mass harvested from the 20-30 m³ and/or from the 40-70 m³ cultivation pond serves as the starting material. Macroalgae are grown in the 200-500 m³ cultivation pond at algal density of about 1.5-2 Kg/m², which provides for several harvests. Typically, algal fresh mass of about 500-600 Kg is produced within about 6 weeks (summertime) or within 12 weeks (wintertime) in cultivation at a volume of 200 m³.

EXAMPLES

Example 1

Production of *Ulva* Batch GH 6/7

Growth was started in a small inoculum tank of 0.5 m³. 150 gr of the algae at an average size of 2-15 cm² were inoculated in the small tank and left to grow for 13 days. Manual fragmentation of the growing algae to keep the size at 2-15 cm² was made as necessary, typically once a day. Average growth rate was 510 gr/m²/day. The algae reached weight of 2.15 Kg. 700 gr of this mass were transferred to a larger inoculum tank (1.5-2 m³) and growth continued for additional 10 days. The measured growth rate was 440 gr/m²/day and total algal weight of 4.24 Kg was produced. On the $11^{th}$ day, all the algal mass was transferred to a first cultivation pond of 6 m². Algae were grown in this cultivation pond for 13 days at an average growth rate of 200 gr/m²/day. After total of 36 days of growth the complete algal mass (20 Kg) was transferred to a second cultivation pond of 18 m². After additional 18 days of growth at an average growth rate of 120 gr/m²/day algae were harvested. Total yield of 70 Kg after a total growth period (from the first inoculum) of 54 days was obtained.

Example 2

Production of *Ulva* Batch GH 3/4

Growth was started in a small inoculum tank of 0.5 m³. 150 gr of *Ulva* (batch GH 3/4) at an average size of 2-15 cm² were inoculated in the small tank and left to grow for 15 days. Fragmentation of the growing algae to keep the size at 2-15 cm² was made manually as necessary, typically once a day. Average growth rate was 180 gr/m²/day. On day 16 the algae reached the weight of 950 gr. 150 gr of this mass were transferred to a larger inoculum tank and growth continued for additional 20 days. The measured growth rate was 180 gr/m²/day and total algal weight of 4.63 Kg was produced. On the $21^{st}$ day, all the algal mass was transferred to a first cultivation pond of 6 m². The algae were grown in the first cultivation pond for 18 days at an average growth rate of 110 gr/m²/day. The complete algal mass obtained (17 Kg) was transferred to a second cultivation pond of 18 m². After additional 21 days of growth at an average growth rate of 80 gr/m²/day algae were harvested. Total yield of 56.4 Kg after a total growth period (from the first inoculum) of 74 days was obtained.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of alternative forms without departing from the invention.

The invention claimed is:

1. A land-based system for the production of macroalgae, the system comprising:
   a. a reservoir containing pristine seawater, wherein the pristine seawater is obtained from at least one coastal well, and is filtrated through sand and rock layers separating the coastal well from the sea,
   b. at least one inoculum tank comprising at least one of a gas distribution system, a jet water system or a combination thereof, the at least one inoculum tank containing a culture medium and pieces of a macroalgae young thalli, wherein the culture medium comprises pristine seawater from the reservoir; and
   c. at least one cultivation pond comprising at least one of a gas distribution system, a jet water system or a combination thereof, the at least one cultivation pond containing a culture medium and macroalgae, wherein the culture medium comprises pristine seawater from the reservoir.

2. The land-based system of claim 1, wherein the system further comprises a mesh covering the at least one inoculum tank and/or cultivation pond.

3. The land-based system of claim 1, wherein the temperature of the pristine seawater is from about 2° C. to about 30° C.

4. The land-based system of claim 3, wherein the temperature of the pristine seawater is a constant temperature of from about 20° C. to about 25° C.

5. The land-based system of claim 4, wherein the temperature of the pristine seawater is about 22° C.

6. The land-based system of claim 1, wherein the pristine seawater is essentially free from pollutants and pathogens.

7. The land-based system of claim 6, wherein the pristine seawater is rich in essential minerals selected from the group consisting of calcium, magnesium, carbonates and any combination thereof.

8. The land-based system of claim 1, wherein the pristine seawater is obtained from a deep costal well.

9. The land-based system of claim 1, wherein the pristine seawater is purified seawater obtained from a water treatment system.

10. The land-based system of claim 9, wherein the seawater treatment system comprises a sand filter, ozonation tank and active carbon filter.

11. The land-based system of claim 1, wherein the culture medium consists of the pristine seawater.

12. The land-based system of claim 1, wherein the culture medium further comprises at least one additional nutrient selected from the group consisting of nitrogen, phosphate and a combination thereof.

13. The land-based system of claim 1, wherein the inoculum tank has a half-ball shape.

14. The land-based system of claim 13, wherein the inoculums tank has a volume of 0.5-3 cubic meters ($m^3$).

15. The land-based system of claim 1, wherein the opening of the cultivation pond has a quadrangle configuration, a U shape or cube shape.

16. The land-based system of claim 1, wherein the gas distribution system comprises a gas source device and a plurality of gas tubes comprising at least one gas inlets and a plurality of gas outlets, wherein the plurality of gas tubes is positioned along the base of the cultivation pond.

17. The land-based system of claim 1, wherein the pH of the culture medium is kept below 9.5.

18. The land-based system of claim 1, wherein the macroalgae is of a genus selected from the group consisting of *Ulva, Porphyra, Laminaria, Undaria, Eucheuma, Gracillaria, Sargassum, Codium, Furcellaria, Cladophora, Ascophyllum* and *Palmaria*.

19. A method for cultivating macroalgae, the method comprising:
   a. providing at least one inoculum tank having a volume of 0.5-3.0 cubic meter ($m^3$), containing a culture medium comprising pristine seawater; wherein the pristine seawater is obtained from at least one coastal well, and is filtrated through sand and rock layers separating the coastal well from the sea;
   b. inoculating the inoculum tank with about 100-200 g of fragmented young thalli of a macroalgae;
   c. growing the macroalga within the inoculums tank to reach a macroalgae inoculum total fresh mass of about 2-15 kg;
   d. transferring the macroalgae inoculum mass or a part thereof to a cultivation pond having a volume of 5-10 $m^3$ comprising operating gas distribution system and/or operating array of jet water pipes, containing a culture medium comprising pristine seawater;
   e. growing the macroalgae inoculum mass within the 5-10 $m^3$ cultivation pond to reach a macroalgae total fresh mass of about 10-60 kg;
   f. transferring the macroalgae mass or a part thereof to a cultivation pond having a volume of 20-30 cubic meter comprising operating gas distribution system and/or operating array of jet water pipes, containing a culture medium comprising pristine seawater;
   g. growing the macroalgae within the 20-30 $m^3$ cultivation pond to reach a macroalgae total fresh mass of about 100-200 kg;
   h. harvesting the macroalgae mass; or optionally
   i. transferring at least part of the macroalgae mass of the 20-30 $m^3$ cultivation pond to a cultivation pond having a volume of 200-500 $m^3$ comprising operating gas distribution system and/or operating array of jet water pipes, containing culture medium comprising pristine seawater;
   j. growing the macroalgae within the 200-500 $m^3$ cultivation pond to reach a macroalgae total fresh mass of at least 400-1,000 kg; and
   k. harvesting the macroalgae fresh mass.

20. The method of claim 19, wherein step (i) comprises (1) transferring at least part of the macroalgae mass of the 20-30 $m^3$ cultivation pond to a cultivation pond having a volume of 40-70 $m^3$ comprising operating gas distribution system and/or operating array of jet water pipes, containing culture medium comprising pristine seawater; (2) growing the macroalgae within the 40-70 $m^3$ cultivation pond to reach a macroalgae fresh mass of about 100-200 kg; (3) harvesting the macroalgae mass; or optionally (4) transferring at least part of the macroalgae mass of the 40-70 $m^3$ cultivation pond to a third cultivation pond having a volume of 200-500 cubic meter comprising operating gas distribution system and/or operating array of jet water pipes, containing culture medium comprising pristine seawater.

* * * * *